United States Patent [19]

Okey

[11] Patent Number: 4,468,431
[45] Date of Patent: Aug. 28, 1984

[54] POLYIMIDE COMPOSITE

[75] Inventor: David W. Okey, Downers Grove, Ill.

[73] Assignee: IML Corporation, Elk Grove Village, Ill.

[21] Appl. No.: 552,509

[22] Filed: Nov. 17, 1983

[51] Int. Cl.³ .................. B32B 3/26; B32B 27/08
[52] U.S. Cl. .................. 428/317.7; 428/319.1; 428/473.5
[58] Field of Search .......... 428/316.6, 317.1, 317.7, 428/319.1, 473.5; 521/185

[56] References Cited

U.S. PATENT DOCUMENTS

| | | | |
|---|---|---|---|
| 2,999,041 | 9/1961 | Lappala | 428/316.6 |
| 3,496,058 | 2/1970 | Schroter et al. | 428/319.1 |
| 3,535,198 | 10/1970 | Bloom | 428/317.7 |
| 3,542,703 | 11/1970 | De Brunner | 521/185 |
| 3,713,961 | 1/1973 | Copeland et al. | 428/473.5 |
| 4,022,649 | 5/1977 | Nakagome et al. | 428/473.5 |
| 4,264,669 | 4/1981 | Yuan | 428/473.5 |
| 4,316,934 | 2/1982 | Maier et al. | 428/319.3 |

FOREIGN PATENT DOCUMENTS 2822884 11/1979 Fed. Rep. of Germany ... 428/319.7

Primary Examiner—William J. Van Balen
Attorney, Agent, or Firm—McDougall, Hersh & Scott

[57] ABSTRACT

A composite for use in vibration damping and thermal insulation in aerospace applications formed from a core of a foamed polyimide, with a backing layer bonded to one face of the core. This backing layer to include a thin meal foil bonded to the core with a visco-elastic adhesive. Composite provides superior damping and lower weight and significantly improved fire safety compared with existing products.

11 Claims, 3 Drawing Figures

POLYIMIDE COMPOSITE

This invention relates to polyimide composites and, more specifically, to polyimide composites for use in vibration damping and thermal insulation applications.

As is now well known to those skilled in the art, polyimides have found wide-spread use in the aircraft and aerospace industries by reason of their lightweight, chemical inertness, curing properties, fire resistance, and resilience over broad temperature ranges. Such polyimides are described in detail in U.S. Pat. Nos. 4,305,796; 4,363,690; 4,367,296; 4,296,208; 4,332,656; 4,355,120; 3,966,652; 4,070,312; 4,153,783; 4,241,114; 4,241,193; 4,255,488; 4,299,787; and 4,319,000.

As described in the foregoing patents, such polyimides are generally prepared by reaction of an aromatic tetracarboxylic dianhydride or derivatives thereof with a diamine to form a substantially linear polyimide polymer. It has now been found, as described in copending application Ser. No. 532,663, filed Sept. 16, 1983, that such polyimides can be formed into foams by means of a solid blowing agent whose particle size is closely controlled to provide a homogeneous cellular structure.

One of the significant advantages of polyimide foams having a homogeneous cellular structure stems from the fact that such foams do not lose their strength and resiliency at low temperatures. Most plastic foams become rigid and brittle at such low temperatures, whereas our polyimide foams remain flexible at such temperatures. Because of the tendency of most plastic foams to become rigid at lower temperatures, the performance characteristics of such foams in vibration damping applications deteriorate significantly under the temperature conditions experienced in aircraft and space vehicles. In addition, the plastic foams currently used in vibration damping applications are relatively heavy and flammable.

It is accordingly an object of the present invention to provide a polyimide composite having improved vibration damping characteristics at a lower weight, with superior flame resistance, and less smoke and toxicity.

A more specific objective of the invention is to provide a composite in which the desirable low temperature properties, fire resistance, and low weight of a foamed polyimide can be used to provide superior vibration damping characteristics over a broad range of temperatures.

These and other objectives and advantages of the invention will appear more fully hereinafter; and, for purposes of illustration, drawings illustrating the concepts of the invention are annexed hereto wherein:

Figure 1:
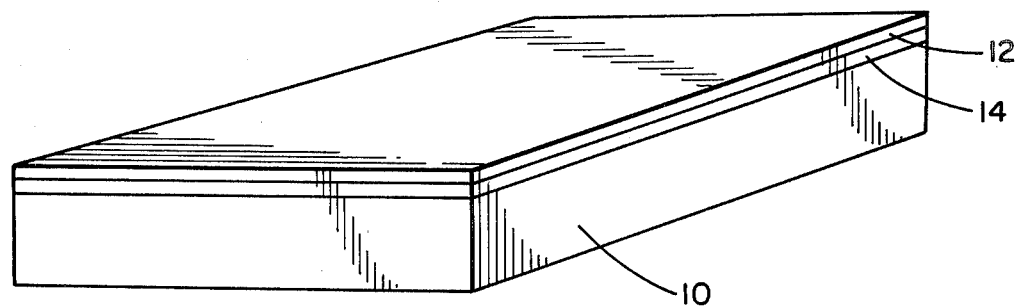
FIG. 1 is a side view of one form of a composite embodying the concepts of the invention.

The concepts of the present invention reside in a composite formed of a core composed of a foamed polyimide prepared by reaction of an aromatic tetracarboxylic dianhydride or derivative thereof with a diamine and a backing layer bonded to one face of the core, the backing layer being a thin metal foil bonded to the core with visco-elastic adhesive. It has been unexpectedly found that the vibration-damping characteristics of such a composite are actually superior even though their mass is significantly less than currently available vibration damping products.

Without limiting the present invention as to theory, it is believed that the thin metallic film, the polyimide foam, and the visco-elastic adhesive all combine to yield increasing vibration damping characteristics even though the density of the foam itself is very low. The net result is that the composite of the present invention enables the use of less dense foams and hence lighter weight materials, to provide increased vibration damping characteristics.

The polyimide foams employed in the practice of this invention are preferably those prepared in accordance with the concepts of copending application Ser. No. 532,663, in which a polyimide prepolymer is blended with a solid blowing agent, the particle size of which is closely controlled to produce a foam having a homogeneous cellular structure. The dianhydride employed in the practice of this invention is generally one of those described in the foregoing patents, and is preferably 3,3', 4,4'-benzophenone tetracarboxylic acid or a derivative thereof, preferably a lower aliphatic ester derivative. Suitable dianhydrides or derivatives thereof are well known to those skilled in the art.

Reacted with the dianhydride or its derivatives, in the preparation of the polyimide, is one or more aromatic diamine, also well known to those skilled in the art. Suitable diamines are either aromatic, heterocyclic or both, and include one or more of the following amines:
2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'methylene dianiline
2,6-diamino toluene
2,4-diamino toluene
In addition, aliphatic diamines may also be included.

The blowing agents employed in the practice of the invention are solid blowing agents and are described in the foregoing copending application, the disclosure of which is incorporated herein by reference.

As will be appreciated by those skilled in the art, other polyimide foams produced from other starting materials or using other chemical techniques may be employed in place of the polyimide specifically described above.

The thin metallic film or foil employed in the practice of this invention depends somewhat on the particular application. It is generally preferred that the foil be an aluminum foil by reason of its cost and corrosion-resistant characteristics. The thickness of the foil is not critical and can be varied within relatively wide ranges, such as 0.0001 to 0.005 inches. Visco-elastic adhesives employed in the practice of this invention are themselves well known in the art. As used herein, the term "visco-elastic" refers to an adhesive which does not set up or cure and become rigid, but retains some degree of viscosity after extended aging. Best results are usually obtained with acrylic visco-elastic adhesives such as those commercially available under the trademarks "Ad-Chem" and "ECP".

The amount of the adhesive applied to the composite is likewise not critical and is generally an amount sufficient to securely bond the metal foil to one face of the foam core. Again, without limiting the invention as to theory, because the foam is characterized by a homogeneous cellular structure, it is believed that the adhesive bonds the metal foil to the foam core in such a manner that the metal foil is bonded to the core in discrete areas, thus leaving the foil free to vibrate to a limited extent. The hypothesis, along with the visco-elastic properties of the adhesive, is believed to contribute to the improved vibration damping characteristics of the composite of the invention.

The density of the core itself generally ranges from 0.5 to 5 lbs/ft$^3$. As has been described above, the composite of the present invention provides even greater vibration damping characteristics as the density of the foam itself is increased. For example, it has been determined that foam densities within the range of 1-3 lbs/ft$^3$ provide highly desirable vibration damping characteristics at a low weight and cost level.

In accordance with one embodiment of the present invention, the composite is simply formed on the polyimide foam core having thicknesses ranging from 0.1 to 1 inch or more, depending somewhat on the application. The metal foil (12) preferably aluminum foil, is adhered to one face of the core (10) by means of a thin visco-elastic layer (14) all shown in FIG. 1 of the drawing.

Figure 2:
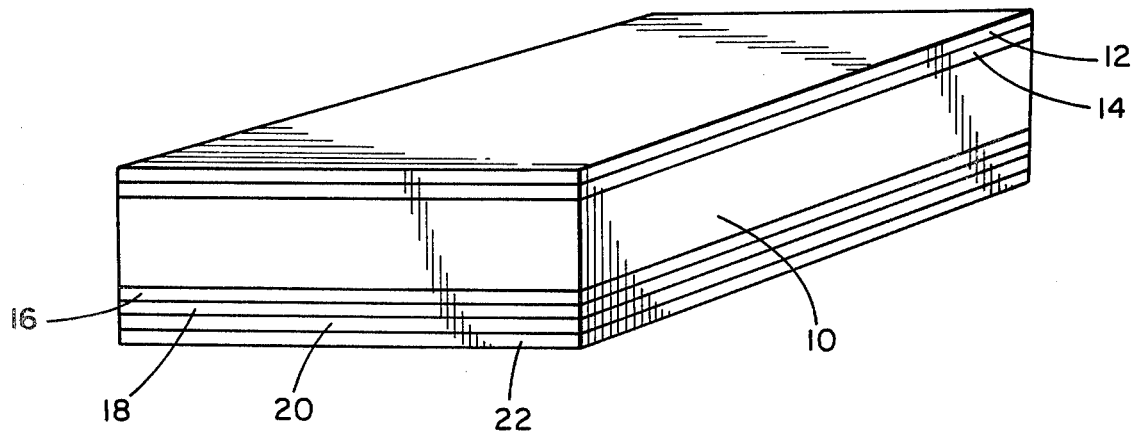
FIG. 2 is a side view of the preferred composite of the invention.

In accordance with one embodiment of the present invention, it is also possible, and sometimes desirable, to include a facing on the opposite face of the core to protect the foam itself. The embodiment is shown in FIG. 2 and includes a core (10) having the thin metal foil (12) bonded to one face by means of the visco-elastic layer (14). Bonded to the other face is another layer of metal foil (18) secured to the face of the core (10) by means of an adhesive (16) preferably in the form of a visco-elastic adhesive such as the one that forms the layer (14).

For ease of use, the metal foil layer (12) includes a stripable protective layer (22) (such as a stripable paper or other fibrous material) adhered to the thin foil layer (12) by means of an adhesive (20). In that embodiment, the application of the composite invention is facilitated because the fibrous layer (22) can simply be stripped off and the composite bonded to whatever substrate it is used in conjunction with by means of the adhesive layer (20). The adhesive used for that purpose can be any adhesive, including, but not limited to, a visco-elastic adhesive of the type used in layers (14) and (16).

Having described the basic concepts of the invention, reference is now made to the following examples which are provided by way of illustration.

EXAMPLE 1

This example illustrates the preparation of a composite having the configuration shown in FIG. 2 of the drawing.

Using the procedure described in copending application Ser. No. 532,663, a polyimide foam panel having a homogeneous cellular structure was prepared by foaming, with a solid blowing agent, a polyimide prepolymer prepared by reaction of 3,3',4,4'-benzophenone tetracarboxylic acid dimethyl ester, 2,6-diamino pyridine and p,p'-methylene dianiline. The polyimide was molded in the form of a core having a thickness of 0.25 inches.

Two different densities of core were prepared, one having a density of 1 lb/ft$^3$ and the other having a density of 3 lbs/ft$^3$. One one face of each of the two different cores, 2 mil aluminum foil was fonded with the acrylic visco-elastic adhesive. On the other face, the aluminum foil was overlaid with a thick layer of Ad-Chem 5845 adhesive on one side and an acrylic visco-elastic adhesive with a strippable paper sheet on the other. Each panel thus formed was tested to determine its vibration damping characteristics. A 1⅜"×7" strip of each test sample was bonded to each tine of a vibrating fork made of ¼ inch thick steel. The fork was electromagnetically excited at one or more of its natural frequencies, and its vibration amplitude sensed by an electromagnetic pickup. The temperature immediately adjacent to the vibration fork was measured by a thermocoupled pyrometer. Upon removal of the excitation, the vibration decay was plotted on FIG. 3 using a high speed level recorder.

That process was repeated at various temperatures ranging from −40° F. up to about 150° F.

Figure 3:
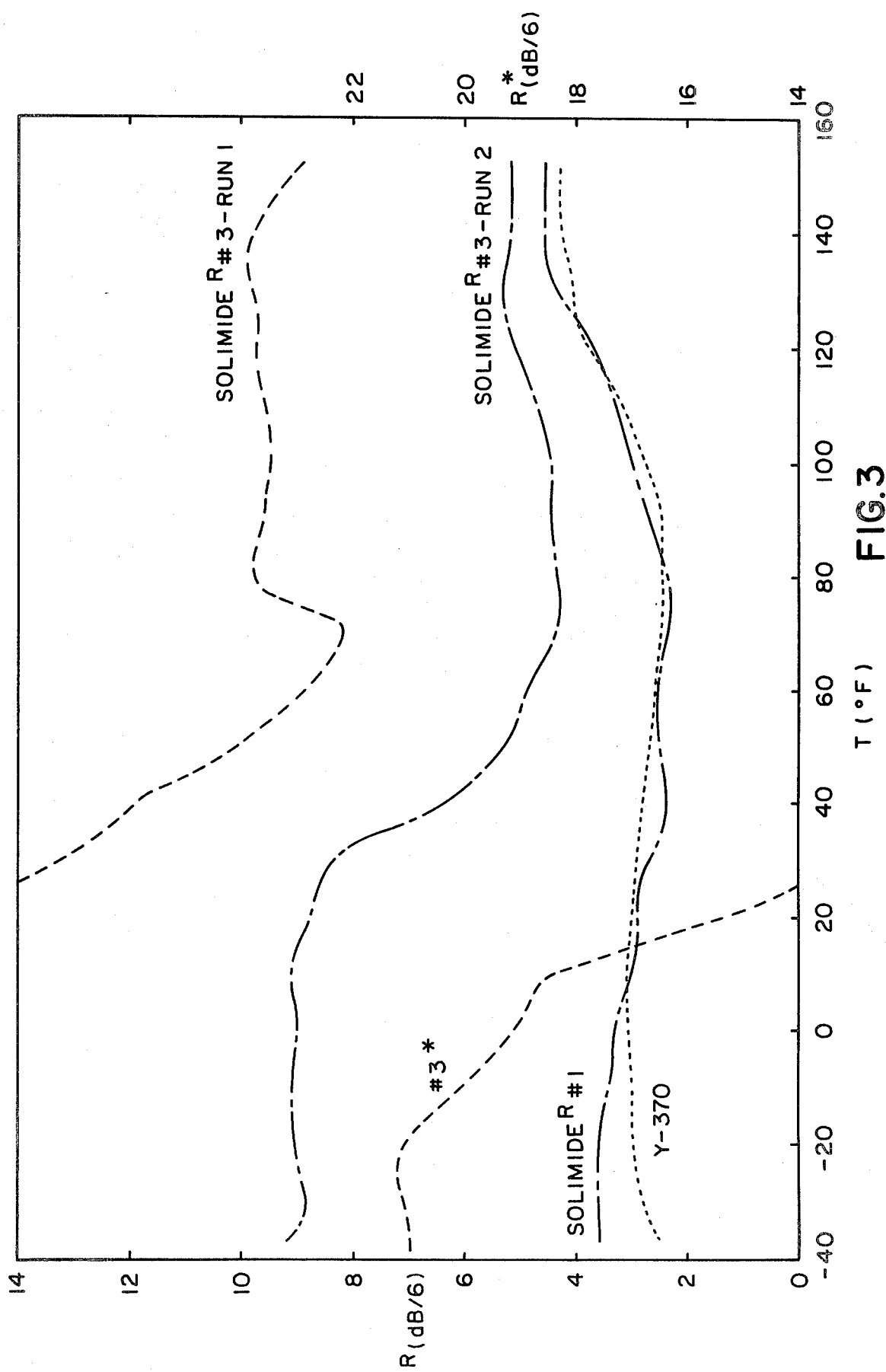
FIG. 3 is a comparison of the vibration damping characteristics of the composite invention as compared to the prior art.

For purposes of comparison, the same test was run on a like material marketed by 3M as "Y370," composed of aluminum foil bonded to a polyurethane foam. This material had a mass of approximately 0.25 lb/ft$^2$, in comparison with the polyimide materials, having masses of 0.1 and 0.14 lb/ft$^2$, respectively. The results of those tests are shown in FIG. 3 of the drawing.

As can be seen from the figure, the polyimide foam composite was superior to the polyurethane composite at lower temperatures for the polyimide density of 1 lb/ft$^3$. The higher density polyimide core at 3 lbs/ft$^3$ provided vastly superior vibration damping characteristics, as shown in FIG. 3.

EXAMPLE 2

Using the same procedures as in Example 1, a polyimide composite was prepared with a core density of 5 lbs/ft$^3$. This sample was tested in the same manner as in Example 1, but at room temperature only. The polyimide composite in this example had a mass of 0.17 lb/ft$^2$, versus 0.25 lb/ft$^2$ for the reference material. The test results were a decay rate of 4.6 dB/sec for the polyimide composite, and only 3.6 dB/sec for the Y-370, in spite of its higher mass.

EXAMPLE 3

Vibration damping foams in aircraft are regulated by the Federal Aviation Authority. Federal Aviation Regulation (FAR) 25.853 covers thermal and acoustical insulation and insulation coverings. We tested the polyimide composite, with a 1 lb/ft$^3$ core, in accordance with the vertical burn test of Appendix F, paragraph b. This test requires that the specimen, simulating sections cut from an actual aircraft, be bonded to aluminum panels. We then applied the flame required for 12 seconds, and compared the results with the advertised results of Y-370 tests, as shown below:

|  | Polyimide Composite | Y-370 | Test Requirements |
| --- | --- | --- | --- |
| Dripping | None | None | None |
| Burn Time (Sec.) | 3 | 12 | 15 (max.) |
| Burn Length (In.) | 3.3 | 6 | 8 (max.) |

We thus demonstrated that out polyimide composite vibration-damping product has significantly better fire characteristics for aircraft usage than the product that is currently commonly used.

It will be understood that various changes and modifications can be made in the details, procedure and formulation, and use without departing from the spirit of the invention, especially as defined in the following claims.

I claim:

1. A composite formed of (a) a core in the form of a foamed polyimide and (b) a backing layer bonded to one face of the core, said backing layer comprising a thin metal foil bonded to the core with a visco-elastic adhesive.

2. A composite as defined in claim 1 wherein the foam has a density within the range of 0.5 to 5 lbs/ft$^3$.

3. A composite as defined in claim 1 wherein the composite also includes a facing layer bonded to the core.

4. A composite as defined in claim 3 wherein the facing layer is a metal foil.

5. A composite as defined in claim 1 wherein the polyimide is prepared by foaming a polyimide formed by reaction of an aromatic tetracarboxylic dianhydride or a derivative thereof with one or more diamines.

6. A composite as defined in claim 5 wherein the anhydride is a benzophenone tetracarboxylic diester.

7. A composite as defined in claim 1 wherein the adhesive is an acrylic adhesive.

8. A composite as defined in claim 1 wherein the metal foil is an aluminum foil.

9. A composite as defined in claim 1 wherein polyimide foam is prepared from the diamines diaminopyridine and methylene dianiline.

10. A composite as defined in claim 1 which includes a backing layer on each face of the core bonded to the core with a visco-elastic adhesive.

11. A composite as defined in claim 9 wherein one metal foil includes a strippable protective layer bonded thereto.

* * * * *